United States Patent [19]

Suzuki et al.

[11] Patent Number: 4,645,703
[45] Date of Patent: Feb. 24, 1987

[54] MAGNETIC RECORDING MEDIUM

[75] Inventors: Takashi Suzuki, Takatsuki; Kunio Hibino, Hirakata; Mikio Murai, Kawanishi; Shigeki Kawase, Toyonaka; Koichi Shinohara, Kobe; Norimoto Nouchi, Katano, all of Japan

[73] Assignee: Matsushita Electric Industrial Co., Ltd., Kadoma, Japan

[21] Appl. No.: 786,348

[22] Filed: Oct. 10, 1985

Related U.S. Application Data

[63] Continuation of Ser. No. 553,299, Nov. 18, 1983, abandoned.

[30] Foreign Application Priority Data

Nov. 19, 1982 [JP] Japan ............................... 57-204042
Oct. 11, 1983 [JP] Japan ............................... 58-189738

[51] Int. Cl.$^4$ ............................................. G11B 5/72
[52] U.S. Cl. ..................................... 428/141; 427/128; 427/131; 428/148; 428/149; 428/150; 428/195; 428/201; 428/694; 428/695; 428/900
[58] Field of Search ............... 428/900, 695, 694, 328, 428/329, 457, 141, 148, 149, 150, 195, 201; 427/129, 128, 131; 360/134–136

[56] References Cited

U.S. PATENT DOCUMENTS

| 3,019,125 | 1/1962 | Eggenberger et al. | 428/900 |
| 4,326,229 | 4/1982 | Yanagisawa | 428/900 |
| 4,337,288 | 6/1982 | Takenaka et al. | 428/900 |
| 4,348,446 | 9/1982 | Mitsuishi | 428/149 |
| 4,425,404 | 1/1984 | Suzuki et al. | 428/900 |
| 4,514,451 | 4/1985 | Suzuki | 428/694 |
| 4,540,618 | 9/1985 | Suzuki | 428/694 |
| 4,564,549 | 1/1986 | Suzuki | 428/141 |

FOREIGN PATENT DOCUMENTS

| 107314 | 9/1978 | Japan . | |
| 116115 | 10/1978 | Japan . | |
| 128683 | 11/1978 | Japan . | |
| 54-18125 | 7/1979 | Japan | 427/131 |
| 094574 | 7/1979 | Japan . | |
| 54-143111 | 11/1979 | Japan | 427/131 |
| 10455 | 2/1981 | Japan . | |
| 16937 | 2/1981 | Japan . | |
| 56-77927 | 6/1981 | Japan | 428/900 |
| 162126 | 10/1982 | Japan . | |
| 195321 | 12/1982 | Japan . | |

Primary Examiner—Ellis P. Robinson
Attorney, Agent, or Firm—Cushman, Darby & Cushman

[57] ABSTRACT

A magnetic recording medium comprises steep mountain-shaped protrusions having heights ranging 50–600 Å and distributed at a rate of $1\times50^5$–$1\times10^8$ protrusions/mm$^2$ on a surface of ferromagnetic metal layer and further thereon a lubricant layer; the magnetic recording medium is suitable for VTR tape which has a satisfactory durability for repeated use and eliminates head clogging and squealing.

5 Claims, 9 Drawing Figures

MAGNETIC RECORDING MEDIUM

This is a continuation of application Ser. No. 553,299, filed Nov. 18, 1983, which was abandoned upon the filing hereof.

BACKGROUND OF THE INVENTION

1. Field of the Invention

The present invention relates to an improvement in a magnetic recording medium.

The present invention specially concerns improvement in the magnetic recording medium specially suitable for magnetic recording tape, magnetic disc, especially for magnetic recording tape for video tape recorder of rotary heads type.

2. Description of the Prior Art

Ferromagnetic thin film type magnetic recording medium, manufactured by forming such a ferromagnetic thin film as of Fe, Co, Ni or their alloys or their oxides on a polyester film, polyimide film or the like high polymer plastic film or non-magnetic metal film or other substrate by means of vacuum deposition, ion plating, spattering, or the like method, is known. These recording media is advantageous in that its recording density can be drastically increased in comparison with the conventional coated-magnetic-film type recording media. For such high density recording, pole gap of the magnetic recording head must be made very small and furthermore surface of the magnetic recording medium must be made very smooth to decrease spacing loss to the utmost extent. However, when the tape surface is too much smoothed, it has been found that squealing of the tape is induced when running around a recording head drum, and therefore the surface state must be finished with a good controlling. Since the thickness of the ferromagnetic thin film is only 100 Å–5000 Å, the surface condition of the magnetic recording medium is greatly influenced by the surface configuration of the substrate plastic film. Accordingly there have been many proposals to control the surface conditions of the substrate film surfaces. One of the proposals is disclosed in the Japanese Patent unexamined publication No. Sho 53-107314 disclosing that a magnetic recording medium made by forming a ferromagnetic thin film on a substrate polyester film having thermo-plastic minute granular protrusions has satisfactory tape running characteristic and also a good reproduced picture quality. But this conventional magnetic recording medium has a problem that, when surface roughness of the ferromagnetic recording medium is made to be 300 Å in order to improve the surface smoothness of the magnetic recording medium or attaining a high recording density, stick slips are produced thereby inducing the squealings.

In order to eliminate the squealing of the tape running around the head drum, many proposals have been made, for example, in the Japanese Patent unexamined publications Nos. Sho 53-116115, 53-128685, 54-94574, 56-10455, 56-16937, 57-162126, 57-195321. In these proposed arts, it is proposed that characteristic of touching the head and running is intended to be improved by evenly forming relatively finely roughned surface, for instance, wrinkle shape protrusions, minute earth worm shape protrusions or minute granular shape protrusions, to improve running and head cylinder touching characteristic at the same time. The above-mentioned improvements are very effective in improving the characteristics of head touching, squealing and running in normal temperature and normal moisture condition.

The surface of the recording head especially of a high speed rotating VTR recording heads are likely to be clogged by minute particles of adhesive substance or pasty substance such as fat or pitch which are allergen to the recording head or the magnetic recording medium. For such dirtying phenomenon, the above-mentioned prior disposals are found not effective. For coating type magnetic recording medium, by including minute granules of abrasive to produce minute protrusions on surface of the recording medium, a head-cleaning effect is intended to prevent the dirtying phenomenon. But surface of the aforementioned vacuum deposited, ion plated, spattered or the like manufactured recording medium has relatively moderate radiations of the protrusions, and therefore substantially no polishing effect on the dirtied surface of the recording head. The inventors did many experimental studies and found that magnetic recording medium having a surface with steep mountain-shape protrusions at a rate of large number per area has an effective cleaning function, and made the present invention.

SUMMARY OF THE INVENTION

The purpose of the present invention is to provide a magnetic recording medium having improved characteristics in prevention of head clogging phenomenon and squealing in a high temperature, high moisture condition to repeated use.

The magnetic recording medium in accordance with the present invention comprises
a substrate of non-ferromagnetic characteristic, and
a ferromagnetic thin film, formed on the substrate, characterized by
protrusions of steep moutain-shape having 50–600 Å heights and distributed with numbers of $1 \times 10^5$–$1 \times 10^8$ protrusions per 1 $mm^2$ on an active surface of the ferromagnetic thin film, and
a lubricant layer formed on the ferromagnet thin film.

DETAILED DESCRIPTION OF THE PREFERRED EMBODIMENTS

Figure 1:
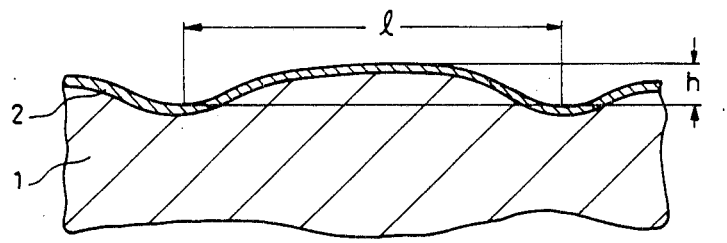
FIG. 1 is a schematic sectional elevation view of the conventionally proposed magnetic recording medium.
Figure 2:
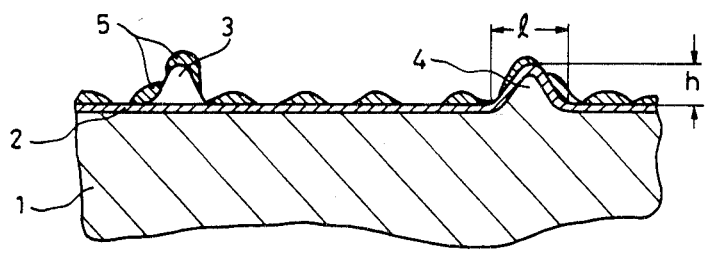
FIG. 2 is a schematic sectional elevation view of a first example of a magnetic recording medium embodying the present invention.
Figure 3:
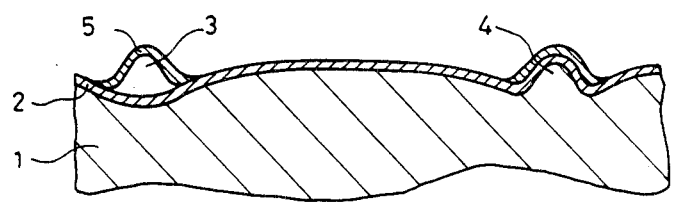
FIG. 3 is a schematic sectional elevation view of another example of a magnetic recording medium embodying the present invention.
Figure 4:
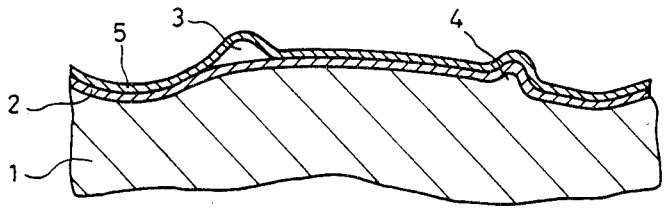
FIG. 4 is a schematic sectional elevation view of another example of a magnetic recording medium embodying the present invention.

Preferred examples of the present invention is described hereafter with reference to FIG. 1 which is a sectional elevation view of general conventional magnetic recording medium as comparison, FIG. 2 through FIG. 4 which are sectional elevation views of various examples embodying the present invention. In all the sectional elevation views numeral 1 designates a substrate such as high polymer plastic film or any suitable non-magnetic material, numeral 2 designates a ferromagnetic metal thin film, and numeral 3 shows mountain-shape protrusions formed above the ferromagnetic metal thin film, numeral 4 shows steep mountain-shape protrusions formed on the surface part of the substrate 1 and numeral 5 designates lubricant layer formed on the surface. Also in the drawing l and h designate average length and heights of the steep mountain-shape protrusions.

In the conventional magnetic recording tape, their protrusions on the surface of the ferromagnetic metal thin film of wrinkle-shape, earthworm shape or granular shape has such sectional shape of the steep protrusions that the ratio l:h in the direction of the running of the magnetic recording medium with respect to the recording head is at least 10:1, and usually 50–100:1. Contradistinct to the above-mentioned conventional magnetic recording medium, the magnetic recording medium in accordance with the present invention comprises the feature that the steep mountain-shaped protrusions formed on the surface has a ratio of length l:h of 10:1 or less, more preferably 5:1 or less. By providing such steep protrusions on the surface of the magnetic recording medium at the rate of the number of protrusions of $1 \times 10^5 - 1 \times 10^8/mm^2$, it is found that undesirable head clogging and squealing were prevented.

Further, it was found that the heights of the mountain-shape protrusions should be 50–600 Å, and more preferably 70–300 Å. Over 600 Å of the heights, spacing loss becomes too much, and under 50 Å of heights, the prevention of head clogging is not obtained. The above-mentioned heights of the protrusions are as defined in ISO R468-1966 or JIS B0601 Standard. And such heights of the protrusions are measured by using high accuracy contact tip type roughness meter (Talystep-1 of Taylor-Jobson Co., Ltd. USA), and the measured roughness is represented with the value which is level difference from the peak of the protrusion to the bottom of the valley of the surface in accordance with ISO or JIS. Number of steep mountain-shape protrusions per 1 mm$^2$ was counted by using differential interference optical microscope (Optiphoto XP-NR type of Nippon Kogaku Kogyo Kabushiki Kaisha of Japan) or by scanning type electron microscope by observing at least 10 microscopic fields to count the number in the fields to calculate the average number per 1 mm$^2$.

As modes of embodiments of the present invention, the magnetic recording medium having steep mountain-shape protrusions on the flat surface of the film can be used, but more preferable modes are as shown in FIG. 3 wherein the steep mountain-shape protrusions are formed at the concave parts of the surface of magnetic recording medium having relatively moderate undulations of wrinkle shape, earthworm shape or granule shape, as shown in FIG. 4, wherein steep mountain-shape protrusions are formed on various parts (not limited at the concave parts but on the convex parts or on any parts) of the magnetic recording medium having moderate undurations of wrinkle shape, earthworm shape or granule shape. In the above-mentioned two cases, namely the steep mountain-shape protrusions being formed on the moderate undurationed surface of the magnetic recording medium, the heights of the steep mountain-shape protrusions should be higher by at least 20 Å, preferably by 50 Å or more higher than the heights of the moderate undulations on the surface of the magnetic recording medium. Besides, the moderate undulations are effective when disposed with pitch of 0.1–10 μm.

The magnetic recording medium in accordance with the present invention can be manufactured by a process, using as the substrate of a polyester film having good surface evenness and having protrusions of wrinkle shape, earthworm shape or granule shape on the surface, and then separating low polymer polyester components, namely oligomer minute crystals on the surface of the film, and thereafter or simultaneously forming a ferromagnetic thin film in a vacuum, followed by forming a lubricant layer. In this case, the separated oligomer minute crystals form the steep mountain-shape protrusions.

In other way of manufacturing, the magnetic recording medium in accordance with the present invention comprises the steps of using a polyester film substrate having good surface evenness as substrate, and thereon forming a wrinkle shaped crystalline high polymer thin film containing very fine granules of carbon black, very minute silica or metal powder, or alternatively during the manufacturing process of a polyester film having a good surface evenness applying a cross-linked high polymer thin film containing the above-mentioned very minute granules. Thereby, protrusions of very minute granules or earthworm shape or granular protrusions are produced on the surface of the resultant polyester film, at the end of the manufacturing of the film. And thereon, a ferromagnetic metal thin film is formed, followed by forming a lubricant layer thereon.

Still another way of manufacturing comprises a steps of using a polyester film of good surface evenness or polyester film having minute protrusions of wrinkle shape, earthworm shape or granule shape, forming thereon a resin intermediate layer containing various kind of resin minute granules, minute granules of various metal oxide or various metal hydroxide or carbon black as nuclei of steep mountain-shape protrusions, and thereon forming a ferromagnetic metal thin film followed by forming a lubricant layer thereon.

Still another way of manufacturing the magnetic recording medium in accordance with the present invention comprises the steps of using a polyester film having a surface provided with minute protrusions of wrinkle shape, earthworm shape or granule shape, and thereon forming ferromagnetic metal thin film, and thereon forming a diluted solution containing a binder and very minute granules of carbon black, minute silica or metal powder or the like, and after coating the solution is dried and baked followed by forming a lubricant layer thereon.

As the substrate, besides the above-mentioned polyester film, any film of stable polymer resin such as polyimide, polyamides, polystyrol, polycarbonate, polyarylate, polysulfon, polyethersulfon, polyacrylate, polyvinylchloride, polyvinylbutyral, polyphenyleneoxide and phenoxy resin, and substrate of metal foil such as stainless steel foil, titanium foil, etc. can be used.

In order to form the ferromagnetic metal thin film on the substrate film, surface of which is prepared to have desirable protrusions as above-mentioned, vacuum deposition, ion plating, spattering or the like ways of forming can be applied directly on the substrate or with underlying thin film of aluminum, titanium, chromium or the like inbetween. Alternatively, such non-magnetic thin film may be inserted as separator between two ferromagnetic thin films. In the above-mentioned forming of the ferromagnetic metal thin film, it is preferable that by inclusion of oxygen in the ferromagnetic metal thin film and the underlying thin film (to partly oxidize the metal, in order to increase bonding force to the substrate film thereby to improve still life).

The lubricant to be formed on the surface of the ferromagnetic metal thin film may be formed all over the surface as shown in FIG. 4, but alternatively, may be formed partly as shown in FIG. 2 or FIG. 3. For a purpose of forming the lubricant layer, either a direct coating on the surface of the ferromagnetic metal thin film or vapor deposition, depending on the material, or indirect coating by transferring from the rear surface of the magnetic recording medium on which the lubricant layer has been coated or vapor deposited to the front surface of the magnetic recording medium when the medium is wound up on a reel or the like, is usable. In order to strongly fixing the lubricant layer on the surface of the magnetic recording medium, a suitable resin binder may be used.

For lubricant, fatty acid, fatty acid esters, fatty acid amides, metallic soaps, aliphatic alcohols, parraffins, silicones, fluorine-surfactants, fluorinated polymer compounds, inorganic lubricant, etc. are usable as such or as mixture of at least two of them.

In any case, the amount of the lubricant to attain the lubrication effect should be at a rate of 0.5–500 mg/m$^2$, and more preferable range is 5–200 mg/m.

As the fatty acid, those having 12 carbons or more, such as lauric acid, myristic acid, palmitic acid, stearic acid, behenic acid, oleic acid, linolic acid, linolenic acid, etc., can be used.

As the fatty acid ester, stearic acid ethyl, stearic acid butyl, stearic acid amyl, stearic acid monoglyceride, palmitic acid monoglyceride, oleic acid monoglyceride, pentaerythritol-tetrastearate, etc., can be used.

As the fatty acid amide, caproic acid amide, capric acid amide, lauric acid amide, palmitic acid amide, stearic acid amide, behenic acid amide, oleic acid amide, linolic acid amide, methylene bis-stearic acid amide and ethylene bis-stearic acid amide, etc., can be used.

As the metal soap, salts of lauric acid, myristic acid, palmitic acid, stearic acid, behenic acid, oleic acid, linolic acid, linolenic acid and zinc, lead, nickel, cobalt, iron, aluminum, magnesium, strontium, copper, etc., and salts of alkyl sulfonate derived from acids of lauryl, palmitil, myristil, stearyl-behenyl, oleyl, linol, linolen, etc., and the above-mentioned metals can be used.

As the aliphatic alcohols, cethyl alcohol and steariI alcohols can be used.

As the paraffin, such saturated hydrocarbons as n-octadecane, n-nonadecane, n-tridecane, n-docosane, n-dotriacontane, etc., can be used.

As the silicone, polysiroxane having its hydrogens partly substituted by alkyl group or phenyl group, and those further denatured by fatty acid, aliphatic alcohols, acid amide or the like can be used.

As the fluorine surfactant, salts of perfluoroalkyl carboxylic acid or perfluoroalkyl sulfonic acid and sodium, potassium, magnesium, zinc, aluminium, iron, cobalt or nickel, and perfluoroalkyl phosphate ester, perfluoroalkyl betaine, perfluoroalkyltrimethyl ammonium salt, perfluoroethylene oxide, perfluoroalkyl fatty acid ester, etc., can be used.

As fluorimated polymer compounds, copolymer of polytetra-fluoroethylene, polyfluorovinylidene and tetrafluoroethylene-ethylene, copolymer of tetrafluoroethylenehexafluoropropylene and denatured compounds which are made by introducing various polarity radicals to the above-mentioned polymers can be used. As the above-mentioned compounds, Sumiflunon (Trademark) made by Sumitomo Kagaku Kogyo Kabushiki Kaisha, AGLUB (Trademark) made by Asahi Garasu Kabushiki Kaisha, or the like are available in the market. The above-mentioned compounds are soluble in fluorine contained solvent, and accordingly can be formed as the lubricant layer by known ordinary coating method.

Furthermore, lubricant layer of excellent bonding nature can be formed by plasma polymerization method. In such plasma polymerization, such fluorine contained compounds as tetrafluoroethylene, hexafluoropropylene and tetrafluorocyclic dimeride can be used.

As inorganic lubricant, graphite powder, molybdenum disulfide powder, wolfrum disulfide powder, molybdenum selenide powder, wolfrum selenide powder, calcium fluoride powder or the like can be used.

The lubricant layer is formed by applying the above-mentioned lubricant as such or solving the lubricant and a synthetic resin into a solution and applied, or by depositing from vapor of the lubricant substance on the ferromagnetic thin film surface. In case of the above-mentioned application of the solution, polyester resin, epoxy resin, urethane resin, etc. as binder and anti-static agent, antirust agent, antimold agent or the like additives can be added. The lubricant may be formed partly, for instance, check pattern shaped or oblique stripe-shaped or dot-shaked pattern in some cases.

EXAMPLE 1

Figure 5:
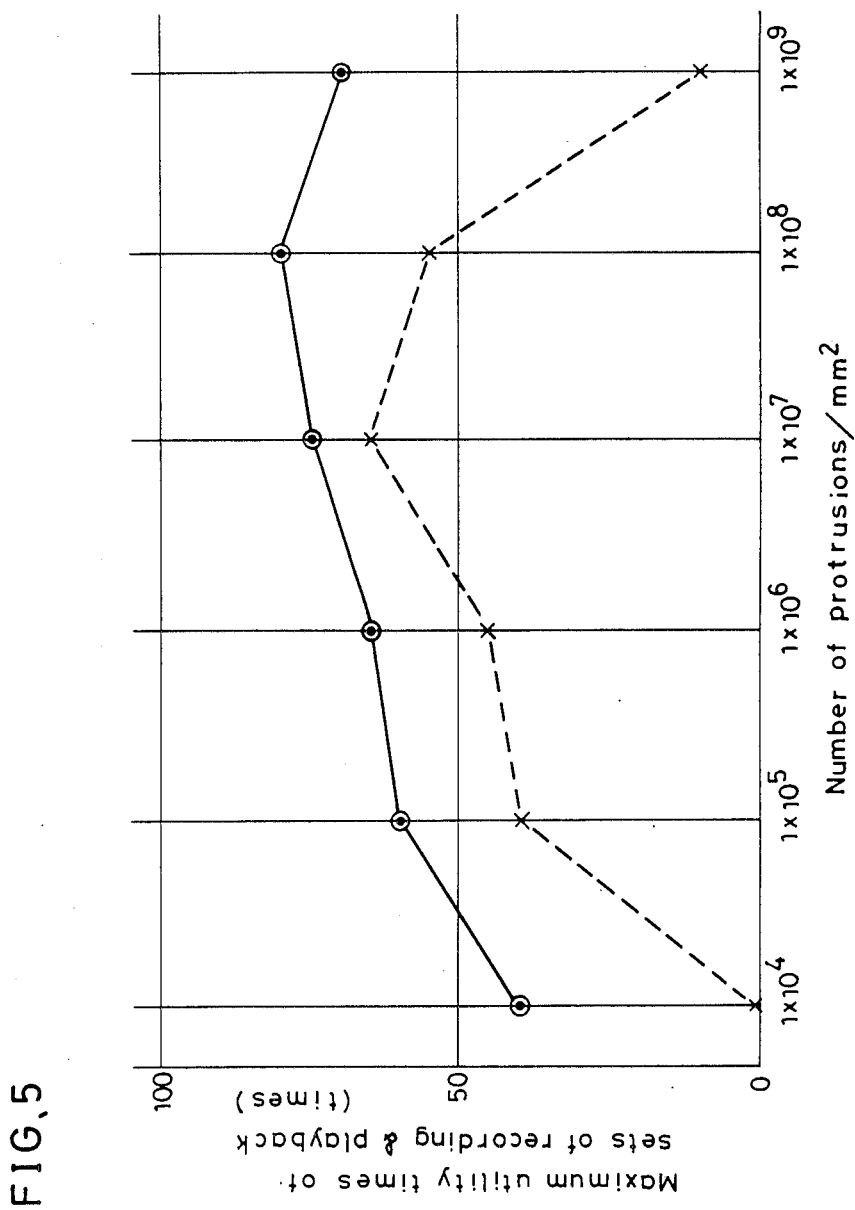
FIG. 5, FIG. 6, FIG. 7 and FIG. 8 are characteristic graphs showing characteristics of the examples of FIG. 1, FIG. 2, FIG. 3 and FIG. 4, respectively, showing number of mountain-shaped protrusions per $mm^2$ and maximum utility times of sets of recording and playback.

On surfaces of smooth-faced polyester films with greatly suppressed of protrusions induced by polymerization catalyst residue, coatings are made by applying solutions of oxidized aluminum colloid granules consisting of hydrolysis products of aluminum-isopropoxido and denatured polyester resin as binder, wherein concentrations are different solution by solution, are applied. And several polyester films respectively coated with the above-mentioned different concentration solutions are dried to form several kinds of samples, each having steep mountain-shape protrusions. And thereon, by means of continuous oblique vacuum deposition method, ferromagnetic metal thin film of CoNi, where Ni is 20 wt % and thin film thickness is 1000 Å, is formed under existence of a small quantity of oxygen. And thereon a lubricant layer is formed by coating stearic acid at a rate of 50 mg/mm$^2$, thereby to produce several samples of magnetic recording medium. Thus on the surface of the magnetic recording medium, steep mountain-shaped protrusions having the oxidized aluminum colloid granules as nuclei are fomed, and their average heights are 100 Å. Then the samples are left for one month under the high temperature high humidity condition of 50° C. and 90% RH, to produce a small amount of rust which is liable to clogg the surface of recording head. Then the magnetic recording medium is used as video recording tape in an ambient of 30° C. and 90% RH, and set of a video recording and a subsequent playback are repeated until a distorted picture due to head clogging takes place. And number of maximum utility, i.e. number of repetition times of the set of the video recording and subsequent playing wherein reproduced video image does not yet have noise due to head clogging is counted, and the result is shown by solid line in FIG. 5. Also number of the set of recording and playing until squealing of tape takes place is recorded by dotted line in FIG. 5

EXAMPLE 2

Figure 6:
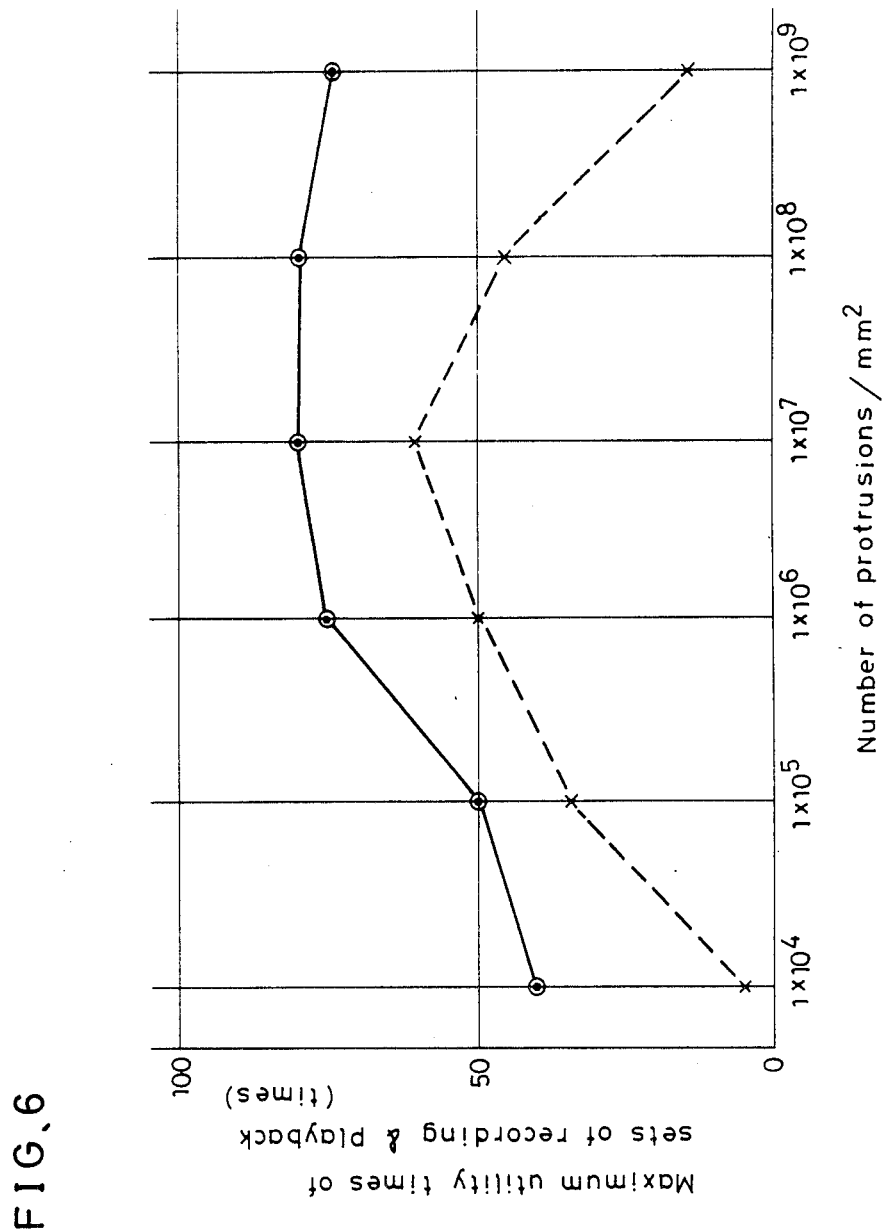

On surfaces of polyester films which hardly contain minutes granules induced by polymerization catalyst residue, wave-shaped protrusions of surface roughness of about 100 Å and about 0.5 μm pitch are formed by coating denatured silicon emulsion solution containing viscosity increasing agent during stretching process of the film making. And thereon ferromagnetic metal thin film of CoNi having 20 wt % nickel and 1000 Å film thickness is formed under the condition of containing small oxygen. And thereon, steep mountain-shape protrusions having silica colloid granules as nuclei are formed by applying silica colloid solution comprising hydrolysis products of tetraethoxysilane, changing the concentrations sample by sample and also containing UV-hardening epoxy resin as binder, thereby to form steep mountain-shape protrusions having silica colloid as nuclei. Further thereon, lubricant layer of palmitic acid amide at a rate of 30 mg/mm$^2$ is formed, thus producing several samples of magnetic recording medium. The surfaces of the magnetic recording mediums have wave-shaped protrusions of about 100 Å heights, and besides, steep mountain-shape protrusions of about 70 Å heights having silica colloid granules as nuclei are formed. For the above-mentioned samples of plural magnetic recording tapes, clogging examination test and squealing examination test are made in the same way as described in example 1, and results are shown in FIG. 6 by solid and dotted lines, respectively.

EXAMPLE 3

Figure 7:
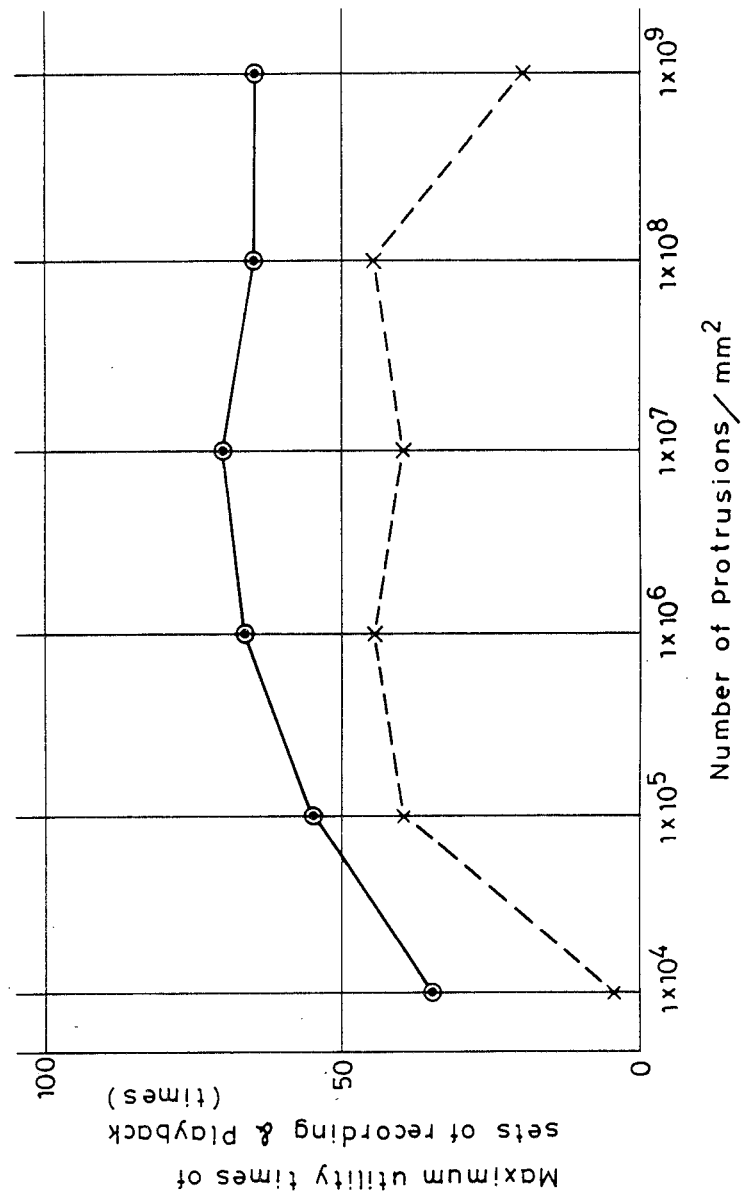

In example 1, the lubricant layer is changed to tetrafluoroethylene telomer (Trade mark AGLUB made by Asahi Garasu Kabushiki Kaisha of Japan). A solution of the above-mentioned lubricant is coated on the ferromagnetic metal thin film at a rate of 30 mg/m$^2$ to form the lubricant layer of tetrafluoroethylene telomer, thereby making several samples with different steep mountain-shape protrusions concentration. The magnetic recording media are examined of the dirtying of head and squealing, and the examined results are shown in FIG. 7 in the same way as that of example 1.

EXAMPLE 4

Figure 8:
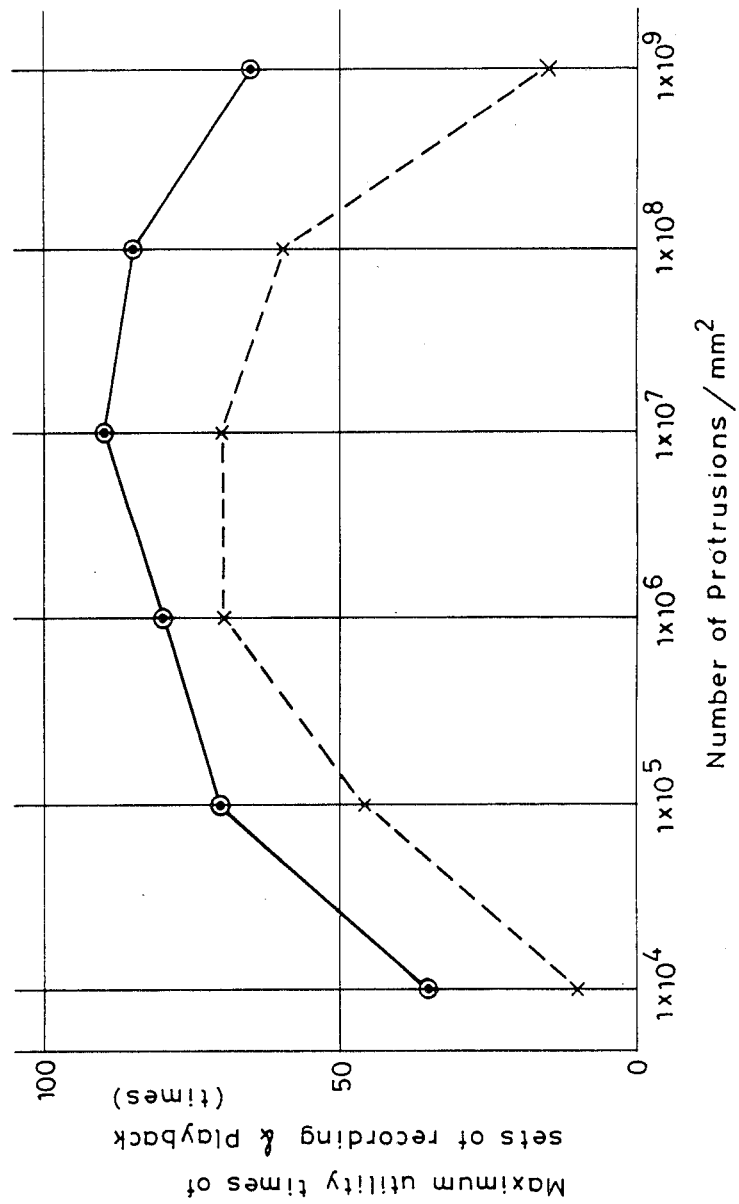

In example 2, the lubricant layer is changed to tetrafluoroethylene dimer plasma polymerization film which is formed under 1 Torr pressure and 200 W power. And the resultant magnetic recording medium samples are examined in the same way as that of example 1 to examine head clogging and squealing, and the results are shown in FIG. 8 in the same way.

EXAMPLE 5

Figure 9:
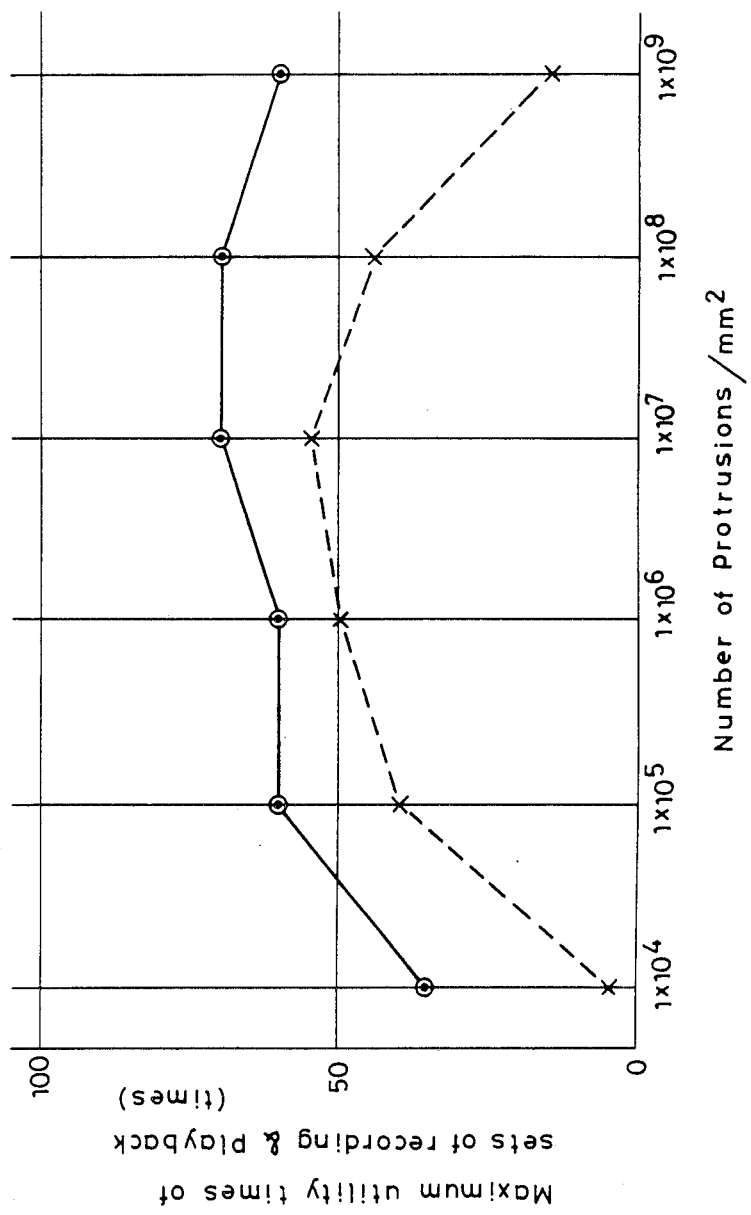

Polyester films, wherein relatively large protrusions induced by polymerization catalyst residue are utmost suppressed, and moderate protrusions having average heights of 70 Å and average diameter of 1 μm and induced by silica minute particles included in the film are provided at a rate of several such protrusions per 100 μm$^2$, are prepared as substrate. On the surfaces of the films, steep mountain-shape protrusions having a silica colloid granules at their nuclei are formed, by coating solutions of methanol silicasol made by Nissan Kagaku Kabushiki Kaisha and polyester resin (Vylon #200 made by Toyo Boseki Kabushiki Kaisha), which have various concentrations respectively for the sample films. On the surface of the above-mentioned films, ferromagnetic metal thin films are formed in the same way as example 1, respectively, and further thereon, tetrafluoroethylene telomer which is the same as that of example 3 are applied as lubricant layer. The surfaces of thus manufactured magnetic recording media have granular protrusions of about 70 Å heights, and besides, steep mountain-shape protrusions having the silica colloid granules as nuclei and having the heights of about 200 Å are formed. The various sample magnetic recording media are examined for head clogging and squealing in the same manner as that of example 1, and the results are shown in FIG. 9 in the same way as example 1.

As shown in FIG. 6 through FIG. 9, the magnetic recording media in accordance with the present invention have good practical durability both with respect to clogging of recording head and squealing when the steep mountain-shape protrusions are formed at a rate of $1 \times 10^5 - 1 \times 10^8$ protrusions per 1 m$^2$. On the other hand, when the number of protrusions are below $1 \times 10^4$/mm$^2$ or above $1 \times 10^9$/mm$^2$, undesirable squealing started at a small number of recording and playing, and durability was poor.

What is claimed is:

1. A magnetic recording medium comprising:
    a substrate of non-ferromagnetic characteristic, and
    a ferromagnetic thin film, formed on said substrate, characterized by
    protrusions of mountain-shape having 50–600 Å heights and distributed with numbers of $1 \times 10^5 - 1 \times 10^8$ protrusions per 1 mm$^2$ on a surface of said ferromagnetic thin film, and
    a lubricant layer formed on said ferromagnetic thin film.

2. A magnetic recording medium comprising:
    a substrate of non-ferromagnetic characteristic, and
    a ferromagnetic thin film, formed on said substrate, characterized by protrusions of mountain-shape having 50–600 Å heights and a ratio of average length of said protrusions to their heights being under 10, and
    distributed with numbers of $1 \times 10^5 - 1 \times 10^8$ protrusions per 1 mm$^2$ on a surface of said ferromagnetic thin film, and
    a lubricant layer formed on said ferromagnetic thin film.

3. A magnetic recording medium in accordance with claim 1 or claim 2, wherein
    said protrusions are formed by protrusions formed on a surface of said substrate.

4. A magnetic recording medium in accordance with claim 3, wherein
    said surface has a form of a moderate wave, and
    said protrusions are provided at recessed parts of said moderately waving surface of said surface.

5. A magnetic recording medium in accordance with claim 1 or claim 2, wherein
    said lubricant layer is formed partly with a minute pattern.

* * * * *